March 7, 1950 R. A. FOLSOM 2,499,738
GATE VALVE
Filed Jan. 30, 1946
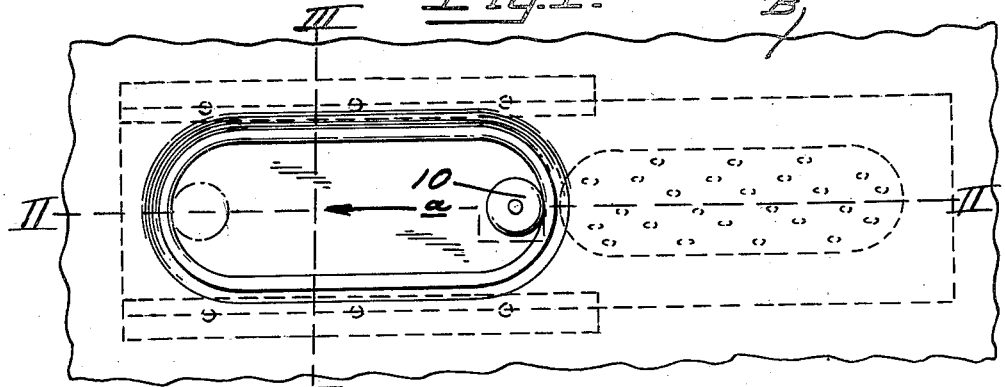
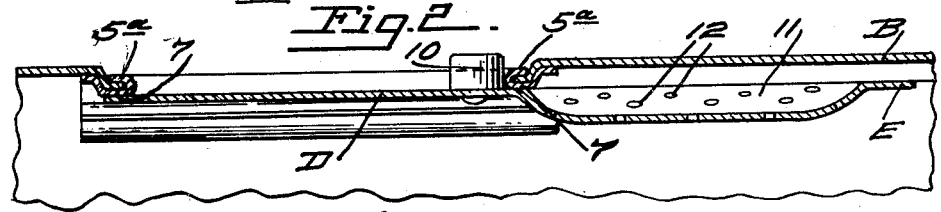
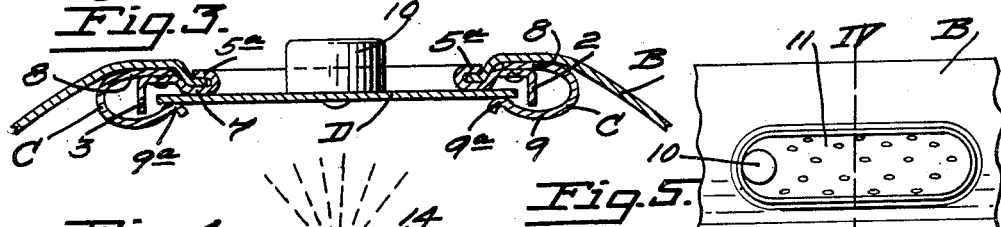
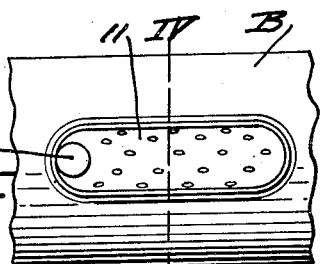
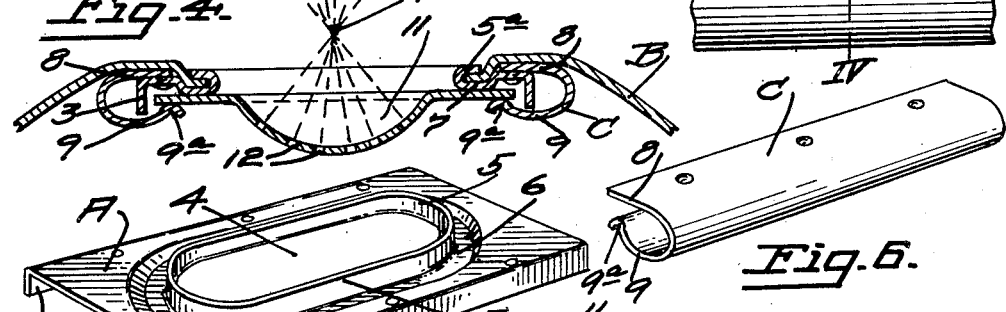
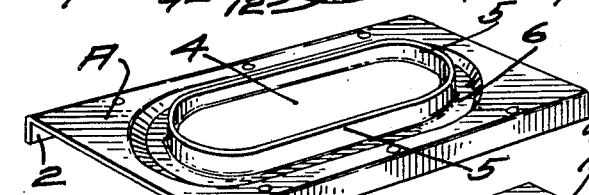
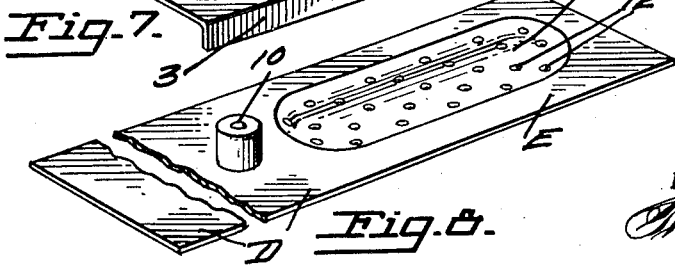
INVENTOR.
ROLFE A. FOLSOM
BY Thomas Castberg
ATTORNEY.

Patented Mar. 7, 1950

2,499,738

UNITED STATES PATENT OFFICE 2,499,738

GATE VALVE

Rolfe A. Folsom, San Jose, Calif.

Application January 30, 1946, Serial No. 644,329

2 Claims. (Cl. 299—143)

This invention relates to a gate valve structure of the type used to regulate the flow or discharge of water from a surface irrigation pipe.

The object of the present invention is generally to improve and simplify the construction and operation of gate valves of the character described; to provide a gate valve in which practically all parts may be made and assembled from die cut and formed sheet metal; to provide a gate valve which is set into and below the outer surface of an irrigation pipe so that several pipes fitted with the valves may be stacked and dragged without danger of damaging the valve mechanism; to provide a gate valve which in one position closes flow or discharge of water and in another position functions as a sprinkler; and further, to provide a simple readily installed mechanism whereby the valve is held at all times against its seat by spring tension.

The gate valve is shown by way of illustration in the accompanying drawings, in which:

Fig. 1 is a plan view of the gate valve showing it applied to a pipe, the pipe being broken away;

Fig. 2 is a longitudinal section taken on line II—II of Fig. 1;

Fig. 3 is an enlarged cross section taken on line III—III of Fig. 1;

Fig. 4 is an enlarged cross section taken on line IV—IV of Fig. 5;

Fig. 5 is a plan view of the valve showing it fitted in an irrigation pipe and with the sprinkler in alignment with the discharge opening;

Fig. 6 is a perspective view of one of the springs;

Fig. 7 is a perspective view of the frame; and

Fig. 8 is a perspective view partially broken away of the valve and the sprinkler.

Referring to the drawings in detail, and particularly Fig. 7, A indicates in general a rectangular-shaped frame having a pair of downwardly extending flanges, one at each side, as indicated at 2 and 3, said flanges extending from end to end of the frame. Formed in the frame is an elongated opening 4 which is surrounded by an upright flange 5 and formed exterior of the flange is a depressed portion 6 which on the under side forms a valve seat 7. The frame is secured within a surface type of irrigation pipe generally indicated at B. An opening is punched or cut out of the pipe, said opening being complementary to the flange 5, in other words just large enough to permit the flange 5 to pass through and snugly fit the opening. When the flange is passed through, it is expanded outwardly and seamed over the depression as shown at 5a, thus securing the frame rigidly within the pipe and forming a seal between the pipe and frame.

A pair of springs generally indicated at C (see Figs. 2, 3 and 6) are preferably applied one to each side of the frame before the frame is inserted in the pipe and the flange 5 is seamed over. These springs extend from end to end of the frame and are substantially U-shaped in cross section to form two legs 8 and 9, the legs 8 being uppermost and being secured during the seaming operation between the inner surface of the pipe B and the upper surface of the frame. The lower legs extend under the flanges 2 and 3 and a suitable distance inwardly therefrom where they terminate in lips 9a which support and engage the under side of a gate valve, generally indicated at D and E (see Fig. 8). That is, the gate valve proper, indicated at D, is a rectangular shaped flat plate to which is secured a knob 10. The valve has an extended portion E in which is formed a concave depression 11 having a plurality of perforations 12 formed therein.

When the gate valve is closed, it assumes the position shown in Figs. 1 and 2, but by grasping the knob 10 and sliding the valve as a whole in the direction of arrow a (see Fig. 1), the perforated portion comes into alignment with the opening 4 and the valve then functions as a sprinkler. In either position of the valve, the lips 9a of the U-shaped springs exert sufficient pressure to maintain the valve in snug engagement with the seat 7. Hence, there is no leakage between the valve and its seat and no water can discharge except when the perforated portion aligns with the opening 4. The valve may also be used for furrow irrigation. For instance, by sliding the valve half way only a portion of the perforations will register with the pipe opening and water will flow through the opening and into an adjacent furrow. No sprinkling effect will result as water discharging through the perforations will be broken up by water flowing longitudinally over the valve and the perforations. If the valve is to be used for furrow irrigation only, the perforated portion of the valve may be punched out completely.

By viewing Fig. 4 it would appear that the several jets of water would cross and impinge against each other at the point indicated at 14, but this is not the case as all perforations are staggered so that no two align and as the concave surface in which the perforations are formed permits the perforations to assume different angles, practically any desired spread when sprinkling may be obtained.

In order to secure the springs C against longitudinal movement with relation to the pipe and frame indentations are made in each side of the frame at the outer edge thereof. Similar indentations are made in the upper leg of each spring and as these register when the frame proper is inserted and secured in place by the seam flange 5a, it is obvious that the springs are rigidly secured both against lateral and longitudinal removal. The gate valve as a whole is made of stamped or die formed sheet metal parts which require no machining and which may be galvanized or otherwise protected against corrosion. The several parts are readily installed and secured in place and any wear that may take place is taken up by the springs C, and while this and other features of the invention have been more or less specifically described and illustrated, it should be understood that changes may be resorted to within the scope of the appended claims and that the materials and finish of the several parts employed may be such as the experience or judgment of the manufacturer may dictate or varying conditions or uses may demand.

Having thus described my invention, what I claim and desire to secure by Letters Patent is:

1. An irrigation pipe valve comprising a frame having an opening therein, a generally planar seat formed on the frame around the opening, a valve member, said valve member being a plate having a planar imperforate portion and a concave perforate portion, said concave portion being spaced away from said seat and being slidable from an unseated position at one side of said opening through an intermediate position partly over said opening into a seated position in registry with said opening, and means for holding said valve member in slidable relationship with said seat.

2. An irrigation pipe valve comprising a frame having an opening therein; a slidable valve member adapted to occupy two extreme positions and an intermediate position with respect to said opening; said valve member having an imperforate portion in one of said extreme positions overlying and blocking said opening, and having a concave perforate portion in the other of said extreme positions overlying said opening, said concave portion being spaced away from said frame and in said intermediate position straddling an adjacent edge of said frame; and means for mounting said valve member for sliding movement with respect to said frame.

ROLFE A. FOLSOM.

REFERENCES CITED

The following references are of record in the file of this patent:

UNITED STATES PATENTS

| Number | Name | Date |
|---|---|---|
| 671,958 | Havard et al. | Apr. 16, 1901 |
| 1,564,598 | Maanum | Dec. 8, 1925 |
| 1,802,199 | Costello | Apr. 21, 1931 |
| 1,832,724 | Mueller | Nov. 17, 1931 |
| 2,074,502 | Congable | Mar. 23, 1937 |
| 2,074,607 | Frey | Mar. 23, 1937 |
| 2,129,758 | Frey | Sept. 13, 1938 |
| 2,148,726 | Brandt | Feb. 28, 1939 |

FOREIGN PATENTS

| Number | Country | Date |
|---|---|---|
| 379,166 | Germany | June 7, 1922 |